Patented June 29, 1926.

1,590,617

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR TREATING PETROLEUM EMULSIONS.

No Drawing.    Application filed December 23, 1924.   Serial No. 757,739.

This invention relates to the treatment of emulsions of mineral oil and water, such as petroleum emulsions, for the purpose of separating the oil from the water.

Petroleum emulsions of the kind referred to are commonly known as "cut oil," "roily oil" and "bottom settlings," and consist of oil constituting the continuous phase of the emulsion, droplets of water distributed throughout the body of oil and constituting the dispersed phase, and films of matter that encase the droplets of water. The conventional process for breaking such emulsions contemplates subjecting the emulsion to the action of a substance or to a compound which acts on the emulsion in such a manner that the water of the emulsion will separate from the oil when the emulsion is allowed to remain in a quiescent state at a suitable temperature after treatment.

In my pending application for Patent Serial No. 757,737, filed Dec. 23, 1924, I have described a process for treating emulsions of the character referred to that broadly contemplates the employment of a class of materials, referred to as water-wettable substances or anti-water-proofing compounds, that are capable of attaching themselves to the walls of the fissures existing in the encasing films, and subsequently being wetted by the droplets of water surrounded by the films, thereby resulting in said droplets of water escaping from the films and coalescing. It is apparent that such materials or substances can be formed in a number of ways, such as the reaction of an oxide or hydrate with an acid as in the case of calcium oxide and oleic acid. Then too, the same compound could be formed by double decomposition, such as the action of sodium oleate with calcium chloride. The latter method is not as convenient because the calcium oleate precipitates out as a curd. The resultant solution with the curdy precipitate could not be used conveniently in ordinary practice, because the solid material would be segregated or isolated in a small part of the liquid material. The ratio or percentage of treating agent to emulsion could not be maintained uniformly by the usual mechanical devices. However, the material could be treated by any of the usual filtration and dehydration processes, and in such form would be substantially the same as a calcium oleate derived by reaction between calcium oxide and oleic acid.

On the other hand, there are certain subdivisions of this broad class of water-wettable substances and anti-water-proofing compounds which are distinguished from the class as a whole, in that the precipitate obtained by double decomposition does not curd out and is immediately suitable for use. The object of my present invention is to make use of substances of the kind just referred to in the treatment of petroleum emulsions to effect the separation of the water from the oil. One example of the class of materials or substances to which my present invention relates is the water insoluble salt of a sulphonated mineral oil. Such material can readily be prepared by the action of calcium, barium, iron or any other member of the heavy metal group, or magnesium oxide or hydrate on the acid sludge derived from petroleum, or by double decomposition with the respective soluble salts and the soluble alkali sludge.

As a specific example of this treating agent I prefer to dissolve the water soluble salt of a petroleum sulphonic acid, or the alkali metal salt of a petroleum sulphonic acid, or the sodium salt of a petroleum sulphonic acid, in water so as to give a solution of approximately 5% strength, and then dilute this solution with an equal volume of water containing sufficient calcium, magnesium or ferrous chloride or sulphate to react with the soluble petroleum sulphonic acid and have some of the precipitating salt in excess. A water insoluble precipitate is immediately formed comparable to the formation of calcium oleate, but it does not curd out. There is no segregation of the insoluble material from the water; it remains suspended in the solution similar to a water suspension of graphite as is used for lubricating purposes, and the mass may be permitted to stand several days before use without segregation.

The above described treating agent is used in the same manner as the agents now used to treat petroleum emulsions, namely, it is introduced into or mixed with the emulsion, and thereafter, the emulsion is allowed to stand in a quiescent state, at a suitable temperature, so as to permit the water to separate from the oil.

Having thus described my invention, what I claim as new and desire to secure by Letters Patent is:

1. A process for treating petroleum emulsions, characterized by subjecting the emulsion to the action of a water insoluble salt of a mineral sulphonated oil.

2. A process for treating petroleum emulsions, characterized by subjecting the emulsion to the action of an alkaline earth salt of a mineral sulphonated oil.

MELVIN DE GROOTE.